United States Patent [19]

Unternahrer et al.

[11] Patent Number: 4,922,502
[45] Date of Patent: May 1, 1990

[54] SOLID-STATE LASER DEVICE COMPRISING A PLURALITY OF EXCITATION UNITS SELECTIVELY ENERGIZED

[75] Inventors: Josef F. Unternahrer; Hiroshi Sekiguchi, both of Tokyo, Japan

[73] Assignee: Hoya Corporation, Tokyo, Japan

[21] Appl. No.: 212,956

[22] Filed: Jun. 29, 1988

[30] Foreign Application Priority Data

Jun. 30, 1987 [JP] Japan .............................. 62-163162

[51] Int. Cl.$^5$ .............................................. H01S 3/06
[52] U.S. Cl. ........................................ 372/66; 372/15; 372/68; 372/70; 372/72; 372/93
[58] Field of Search ...................... 372/66, 69, 70, 72, 372/93, 99, 15, 68, 97

[56] References Cited

U.S. PATENT DOCUMENTS

| | | | |
|---|---|---|---|
| 3,310,753 | 3/1967 | Burkhalter | 372/68 |
| 3,311,844 | 3/1967 | Di Curcio | 372/68 |
| 3,541,468 | 11/1970 | Hammond, Jr. et al. | 372/68 |
| 3,621,456 | 11/1971 | Young | 372/93 |

Primary Examiner—William L. Sikes
Assistant Examiner—B. R. R. Holloway
Attorney, Agent, or Firm—Ladas & Parry

[57] ABSTRACT

In a solid-state laser device comprising a slab-shaped laser medium, first through n-th excitation units are arranged on the slab-shaped laser medium to define first through n-th partial zones and to generate first through n-th laser beams from the first through n-th partial zones along optical axes, respectively. In order to selectively energize the first through n-th excitation units, a reference light beam is previously generated by a beam generator to be delivered through a fixed mirror and a beam distributor to a selected one of the first through n-th partial zones. Thereafter, the reference light beam travels through the slected partial zone to be received by a photosensor. The photosensor detects the selected partial zone to energize a selected one of the first through n-th excitation units that is made to correspond to the selected partial zone. The selected partial zone is excited by the selected excitation unit to generate a selected one of the first through n-th laser beams that is produced through the fixed mirror as the output laser beam. The beam distributor may comprise a rotatable prismal block and first through n-th reflectors which are selectively confronted with the first through n-th partial zones during rotation of the prismal block. Alternatively, first through n-th reflectors may be attached to a support pole.

9 Claims, 10 Drawing Sheets

SOLID-STATE LASER DEVICE COMPRISING A PLURALITY OF EXCITATION UNITS SELECTIVELY ENERGIZED

BACKGROUND OF THE INVENTION

This invention relates to a solid-state laser device which uses a laser medium of a slab shape. It is to be noted in the present specification that such a laser medium will be referred to as a slab-shaped laser medium, respectively.

In general, a slab shaped laser medium used in a solid-state laser device of the type described is excited or pumped to generate a laser beam by the use of an optical source, such as a flash lamp, an arc lamp, a light emitting diode (LED), or a laser diode, and a resonator formed by a pair of mirrors. At any rate, it is necessary in such a solid-state laser device to effectively convert energy given by the optical source into beam energy of the laser beam.

Herein, it is mentioned that the energy given by the optical source is converted not only into the beam energy but also into thermal energy in the slab shaped laser medium. The thermal energy brings about a rise in temperature of the slab shaped laser medium and degrades conversion efficiency of the lamp energy. Accordingly, the rise in temperature of the slab shaped laser medium must be avoided so as to achieve high conversion efficiency of the energy given by the optical source. However, it is very difficult to prevent the slab shaped laser medium from the rise in temperature because the slab shaped laser medium is formed by a crystal, such as glass, alexandrite, or the like, which has a comparatively low thermal conductivity.

Under the circumstances, such a solid-state laser device has been used as a laser device of a pulse oscillation type. In this type of the laser device, an optical source is turned on and off at a predetermined period to excite a slab shape laser medium in a time division fashion and to consequently cause the slab shape laser medium to generate a pulsed laser beam. With this structure, the slab shape laser medium is periodically kept at a quiescent state and is cooled during the quiescent state of the optical source. However, it takes a long time to favorably cool the slab shaped laser medium because of a low thermal conductivity of the slab shaped laser medium. In this connection, the quiescent state should inevitably last for a long time to conveniently avoid a rise in temperature of the slab shaped laser medium. Accordingly, it is difficult to raise a repetition frequency of the pulsed laser beam generated from the slab shaped laser medium.

In an article contributed by Robert L. Byer et al to "Optical Letters" vol. 11(10), pp. 617-619 and entitled "40-W Average Power, 30-Hz Moving-Slab Nd:glass laser," a solid-state laser device has been proposed so as to raise a repetition frequency of a pulsed laser beam, as will later be described with reference to one figure of the accompanying drawing. More particularly, the solid-state laser device comprises a slab shaped laser medium having a pair of principal surfaces and a pair of optical sources which are confronted with each other at a predetermined position with a spacing left between. A pair of metallic plates is located between the respective principal surfaces and the optical sources. Under the circumstances, the slab shaped laser medium is moved towards the optical sources. As a result, the slab shaped laser medium is partially and successively illuminated at the predetermined position by the optical sources. Thus, the principal surfaces of the slab shaped laser medium are entirely scanned by the optical sources at the predetermined position, forming a local laser or excited zone through which a laser beam is generated in the form of the pulsed laser beam. In this event, the local laser zone is successively moved in a movement direction at speed determined by movement speed of the slab shaped laser medium. With this structure, it is possible to avoid a rise in temperature of the slab shaped laser medium by selecting the movement speed of the slab shaped laser medium.

However, the slab shaped laser medium should be moved in the device proposed by Byer et al by a mechanism which should have a high reliability. This shows that operation is dependent on the reliability of the mechanism. Moreover, average output power of the laser beam is restricted by the optical sources.

In addition, unevenness of a temperature distribution takes place in the slab shaped laser medium due to shift or movement of the local laser zone. Such a shift of the local laser zone brings about occurrence of a heat gradient in the slab shaped laser medium because a high temperature portion and a low temperature one appear in the slab shaped laser medium. Such a heat gradient gives rise to nonuniformity of the laser beam and, as a result, to degradation of a beam quality of the laser beam.

SUMMARY OF THE INVENTION

It is an object of this invention to provide a solid-state laser device which can generate a laser beam at a comparatively high repetition frequency by the use of a slab shaped laser medium.

It is another object of this invention to provide a solid-state laser device of the type described, which has a high reliability in operation without depending upon reliability of any mechanism.

It is still another object of this invention to provide a solid-state laser device of the type described, which can raise average output power of the laser beam and improve a beam quality.

According to this invention, a solid-state laser device comprises a slab-shaped laser medium having first and second principal surfaces parallel to each other, first and second end surfaces opposite to and contiguous to the first and the second principal surfaces, and a pair of side surfaces face-to-face to each other and contiguous to the first and the second principal surfaces and the first and the second end surfaces. The slab-shaped laser medium is divisible into first through n-th partial zones extended between the first and the second end surfaces along the side surfaces, where n is an integer greater than unity. The solid-state laser device comprises first through n-th controllable exciting means adjacent to the first through n-th partial zones for individually exciting the first through n-th partial zones to selectively produce first through n-th laser beams through the first and the second end surfaces, beam directing means optically coupled to the first through the n-th laser beams for directing each of the first through n-th laser beams to a predetermined position as an output laser beam, and driving means for selectively driving the first through n-th controllable exciting means in synchronism with the beam directing means by optically coupling the first through n-th controllable exciting means to the beam directing means.

DESCRIPTION OF THE PREFERRED EMBODIMENTS

Figure 1:
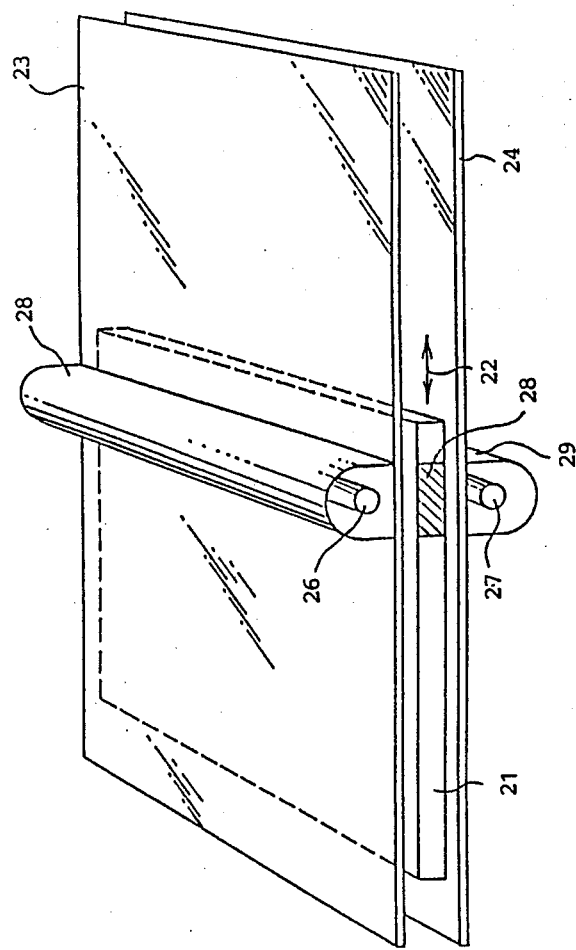
FIG. 1 is a perspective view of a conventional solid-state laser device.

Referring to FIG. 1, description will be made for a better understanding of this invention about a conventional solid-state laser device which is substantially equivalent to that of Byer et al referenced in the preamble of the instant specification. The solid-state laser device comprises a slab shaped laser medium 21 which has first and second principal surfaces directed upwards and downwards of FIG. 1, respectively, and which is reciprocally movable by a driving mechanism (not shown) along a predetermined or movement direction indicated by an arrow 22. The illustrated slab shaped laser medium 21 is interposed between first and second metallic plates 23 and 24 with gaps left between the first and the second principal surfaces and the first and the second metallic plates 23 and 24, respectively. First and second excitation lamps 26 and 27 are located outside of center positions of the first and the second metallic plates 23 and 24 in parallel to each other and are extended in a direction transverse to the predetermined direction. As a result, the first and the second excitation lamps 26 and 27 are confronted with each other through the first and the second metallic plates 23 and 24. The first and the second excitation lamps 26 and 27 are covered with first and second reflectors 28 and 29 and are driven by a drive circuit (not shown).

When the slab-shaped laser medium 21 is reciprocally moved along the arrow 22 towards the center positions of the first and the second metallic plates 23 and 24 and is partially illuminated by the first and the second excitation lamps 26 and 27, the slab-shaped laser medium 21 is excited to form a local laser zone 28 (as shown by a hatch). Consequently, a laser beam is generated from the local laser zone in the direction transverse to the predetermined direction. With movement of the slab-shaped laser medium, the local laser zone is shifted on the slab shaped laser medium 21 in the predetermined direction. According to the solid-state laser device, it is possible to avoid a rise in temperature of the slab-shaped laser medium 21 as a whole, if the slab shaped laser medium 21 is moved at an adequate speed.

However, the illustrated solid-state laser device has shortcomings as pointed out in the preamble of the instant specification.

Figure 2:
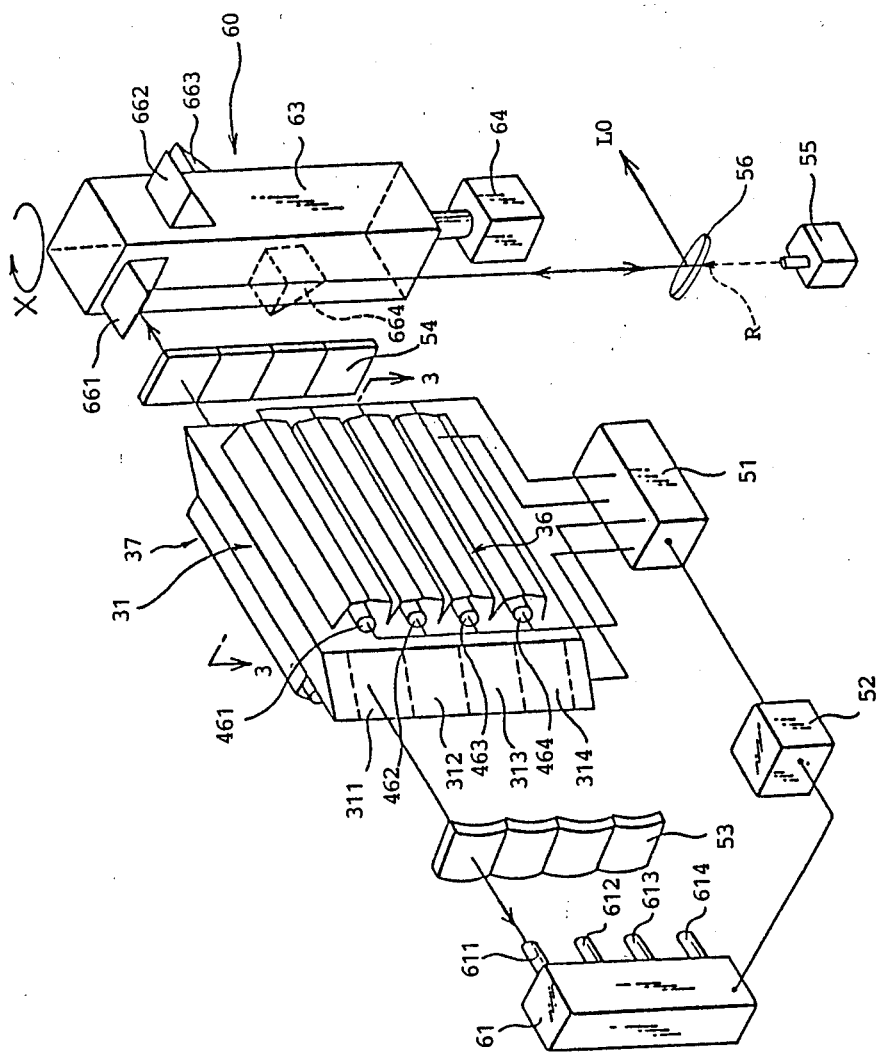
FIG. 2 is a perspective view of a solid-state laser device according to a first embodiment of this invention.

Referring to FIG. 2, a solid-state laser device according to a first embodiment of this invention comprises a slab-shaped laser medium 31 of laser glass which may be, for example, LHG-5 manufactured and sold by HOYA Corporation. The slab-shaped laser medium 31 has first and second principal surfaces, first and second end surfaces contiguous to the first and the second principal surfaces, and a pair of side surfaces contiguous to the principal surfaces and the side surfaces. The first and the second principal surfaces are parallel to each other and are placed on a front side and a rear side of FIG. 2, respectively. The first and the second end surfaces are directed forwards and backwards of FIG. 2, respectively, and serve as incident and output surfaces of laser beams as will later be described. The first and the second end surfaces are parallel to each other and are inclined at an angle of 33° with respect to each principal surface. Therefore, the first and the second end surfaces may be called first and second inclined surfaces, respectively. The illustrated first and second side surfaces are directed upwards and downwards of FIG. 2, respectively.

In the example being illustrated, the slab-shaped laser medium 31 is 410 mm long, 120 mm wide, and 6 mm thick. The laser beams are generated through the first and the second end surfaces and travel within the slab-shaped laser medium 31 in a zigzag manner between the first and the second end surfaces. Therefore, a traveling direction of each laser beam may be defined along the direction parallel to the first and the second side surfaces.

The slab-shaped laser medium 31 is divisible into first through n-th partial zones in a direction transverse to the traveling direction, as shown by broken lines in FIG. 2, where n is a natural number greater than unity. The illustrated slab-shaped laser medium 31 is divided into a center portion, an uppermost portion, and a lowermost portion. The center portion is subdivided into first through fourth partial zones 311, 312, 313, and 314 which are extended between the first and the second end surfaces and which have optical axes along the traveling directions, respectively. The uppermost and the lowermost portions are not used for generating the laser beams.

Figure 3:
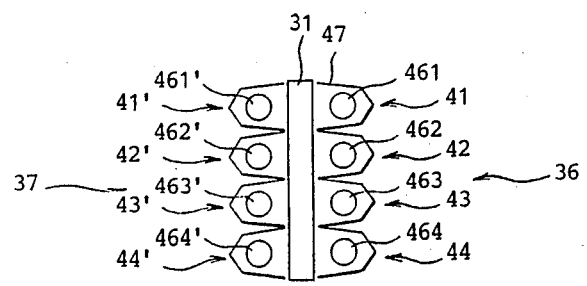
FIG. 3 is a sectional view taken along a line 3—3 shown in FIG. 2.

Referring to FIG. 3 together with FIG. 2, front and rear excitation members 36 and 37 are disposed on the first and the second principal surfaces of the slab-shaped laser medium 31. Specifically, the front excitation member 36 comprises first through fourth front excitation units 41 to 44 for illuminating the first through fourth partial zones 311 to 314 on the first principal surface to excite the first through fourth partial zones 311 to 314, respectively, while the rear excitation member 37 comprises first through fourth rear excitation units 41' to 44' for illuminating the first through fourth partial zones 311 to 314 on the second principal surface to excite them, respectively. Thus, the first partial zone 311 is excited on both the principal surfaces by a pair of the first front and rear excitation units 41 and 41' which may be collectively called a first lamp element. Likewise, the second through fourth partial zones 312 to 314 are excited on the first and the second principal surfaces by pairs of the excitation units 42 and 42'; 43 and 43'; and 44 and 44', which may be also collectively called second through fourth lamp elements, respectively. Each of the excitation units 41 to 44; and 41' to 44' is similar in structure and operation to one another.

As best shown in FIG. 3, the first through fourth front excitation units 41 through 44 comprise first through fourth front excitation lamps 461 to 464, respectively, and the first through fourth rear excitation units 41' to 44' comprise first through fourth rear excitation lamps 461' to 464', respectively. Each of the excitation lamps may be, for example, a xenon lamp. The xenon lamp can be specified by a vacuum tube which has an inner diameter of 10 mm, an arc length of 340 mm, and a wall thickness of 1 mm and which is filled with a xenon gas. The excitation lamps 461 to 464 and 461' to 464' are juxtaposed along the optical axes of the laser beams traveling through the first through fourth partial zones 311 to 314 with space gaps left between the respective excitation lamps and the slab-shaped laser medium 31 and are surrounded by reflectors collectively depicted at 47, respectively.

Each reflector 47 has a flat arch shape in cross section, as shown in FIG. 3, and is therefore formed by a bridge portion and a pair of leg portions jointed to the bridge portion. The leg portions define open ends directed to the slab-shaped laser medium 31 with gaps left between the leg portions and the slab-shaped laser medium 31. Each reflector 47 has a length substantially equal to the arc length of the excitation lamp 46 and a width of 25 mm at the open end. The reflectors 47 of the first through fourth front excitation units 41 to 44 are combined together to form a front reflector block. Similarly, the reflectors 47 of the first through fourth rear excitation units 41' to 44' are also combined together to form a rear reflector block.

As readily understood from the above, the first through fourth front excitation lamps 461 to 464 are parallel to one another and symmetrical to the first through fourth rear excitation lamps 461' to 464' with respect to the slab-shaped laser medium 31, respectively. In addition, the first through fourth front excitation lamps 461 to 464 are disposed with a equidistance left between two adjacent ones of the front excitation lamps 461 to 464. The first through fourth rear excitation lamps 461' to 464' are disposed in a manner similar to the front excitation lamps 461 to 464.

The first through fourth front excitation lamps 461 to 464 are connected to a driver circuit 51 through a pair of electric connections each of which is practically composed of four individual wires, although each connection is depicted at a single line. Likewise, the first through fourth rear excitation lamps 461' to 464' are connected to the driver circuit 51 through an additional pair of electric connections. In the example, the first front and the first rear excitation lamps 461 and 461' of the first lamp element are simultaneously driven in pair by the driver circuit 51 under control of a control device 52 operable in a manner to be described later. Similarly, the second front and the second rear, the third front and the third rear, and the fourth front and the fourth rear excitation lamps 462 and 462'; 463 and 463'; and 464 and 464' are concurrently driven in pairs by the driver circuit 51, respectively.

Thus, each of the first through fourth partial zones 311 to 314 is defined by the first through fourth lamp elements and has an area of 25 mm×6 mm in cross section. This shows that each partial zone can emit the laser beam having a beam size of 25 mm×6 mm in cross section.

It is mentioned here that the slab-shaped laser medium 31 is transparent to a light beam of a predetermined wavelength of, for example, 632.8 nm. Accordingly, it is possible to transmit such a light beam through each of the first through fourth partial zones 311 to 314 prior to generation of each laser beam.

Under the circumstances, the first through fourth front and rear excitation lamps 461 to 464 and 461' to 464' are selectively driven in pairs by transmitting, through the first to fourth partial zones 311 to 314, a light beam which will be referred to as a reference light beam R hereinunder and by monitoring the reference light beam R in a manner to be described later.

In the meanwhile, the slab-shaped laser medium 31 is operable in cooperation with an optical resonator which are placed along the optical axes of the laser beams generated from the first through fourth partial zones 311 to 314. Specifically, the optical resonator comprises a reflector unit 53 and a half mirror unit 54. The reflector 53 has a reflection surface directed to the first end surface of the slab-shaped laser medium 31. The reflection surface of the reflector unit 53 is formed by a first laminated dielectric layer which completely reflects the laser beams generated by each partial zone 311 to 314 and which completely transmits the reference light beam R. The reflector unit 53 is divided into first through fourth portions directed to the first through fourth partial zones 311 to 314, respectively. The half mirror unit 54 has a half mirror surface which is directed to the second end surface of the slab-shaped laser medium 31 and which is formed by a second laminated dielectric layer which reflects 70% of each laser beam and which completely transmits the reference light beam R. The half mirror unit 54 is also divided like the reflector unit 53. The first and the second laminated dielectric layers mentioned above can be readily deposited in a known manner and will not be described any longer. A combination of the front and the rear excitation members 36 and 37, the reflector unit 53, and the half mirror unit 54 serves to excite the partial zones 311 to 314 and may be called an excitation member.

In FIG. 2, the reference light beam R is generated from a beam generator 55 to be sent to a fixed mirror 56. The beam generator 55 may be, for example, an LED, an LD, a He-Ne laser, or the like. The fixed mirror 56 is practically implemented by a plane mirror having front and back surfaces. The reference light beam R is incident on the back surface to be sent through the front surface. As will later be described, the laser beams must be completely reflected on the front surface of the fixed mirror 56. In this connection, the front surface is coated with a laminated dielectric layer such that the laser beams are completely reflected and the reference light beam is completely transmitted. At any rate, the reference light beam R is sent through the fixed mirror 56 to a beam distributor 60.

The beam distributor 60 selectively distributes the reference light beam R to a selected one of the first to fourth partial zones 311 to 314 through the half mirror unit 54 in a manner to be described in detail. The reference light beam R travels through the selected partial zone of the slab-shaped laser medium 31 to the reflector unit 53. Since the reflector unit 53 allows the reference light beam R to pass therethrough, the reference light beam R is transmitted through the reflector unit 53 to a photosensor unit 61 which comprises first through fourth photoelectric elements 611 to 614 directed to the first through fourth partial zones 311 to 314, respectively. As a result, the reference light beam R is received by a selected one of the first through fourth photoelectric elements 611 to 614 to be converted into an electric signal representative of reception of the reference light beam R. The electric signal is supplied from the photosensor unit 61 to the control device 52. The control device 52 detects which one of the photoelectric elements 611 to 614 receives the reference light beam R to produce a detection signal representative of a received one of the photoelectric elements 611 to 614. The detection signal is sent to the driver circuit 51 to drive a selected one of the first through fourth lamp elements that serves to illuminate the selected partial zone through which the reference light beam is transmitted. Consequently, the selected partial zone is illuminated by the excitation lamp pair of the selected lamp element to generate the laser beam in cooperation with the reflector 47. The laser beam is partially sent through the half mirror unit 54 and the beam distributor 60 to the fixed mirror 56 and is delivered to an external device as an output laser beam Lo.

Thus, a combination of the beam generator 55, the fixed mirror 56, the photosensor unit 61, the control device 52, and the driver circuit 51 acts to selectively drive the first through fourth lamp elements and may be called a driver member.

Further referring to FIG. 2, the beam distributor 60 is operable to deliver or distribute not only the reference light beam R but also the laser beams to the fixed mirror 56. In other words, the beam distributor 60 serves to direct or guide the reference light beam R and the laser beams to the fixed mirror 56 located at a predetermined position and may be called a beam directing member. The illustrated beam distributor 60 comprises a prismal block 63 having upper and bottom surfaces each of which has a square configuration, four rectangular side surfaces, and a prismal axis extended from the bottom surface to the upper surface. A motor device 64 is mechanically coupled to the prismal axis to revolve the prismal block 63 around the prismal axis in a sense depicted at an arrow X in FIG. 2.

On the four rectangular side surfaces of the prismal block 63, first through fourth reflector mirrors 661, 662, 663, and 664 are disposed in one-to-one correspondence to the first through fourth partial zones 311 to 314 of the slab-shaped laser medium 31, respectively. Each of the first through fourth reflector mirrors 661 to 664 is identical in structure with one another and has a rectangular equilateral triangle configuration formed in cross section by a pair of equilateral sides and a hypotenuse which define side surfaces and a principal surface, respectively. The principal surface of each reflector mirror 661 to 664 is oblique to each side surface at 45°, as well known. A selected one of the side surfaces of each reflector mirror 661 to 664 is attached to each rectangular side surface of the prismal block 63. The resultant principal surface of each reflector mirror 661 to 664 is directed towards the slab-shaped laser medium 31 and is inclined to each optical axis at an angle of 45°.

The principal surfaces of the first through fourth reflector mirrors 661 to 664 are coated with laminated dielectric layers which can completely reflect both the laser beams and the reference light beam.

Figure 4:
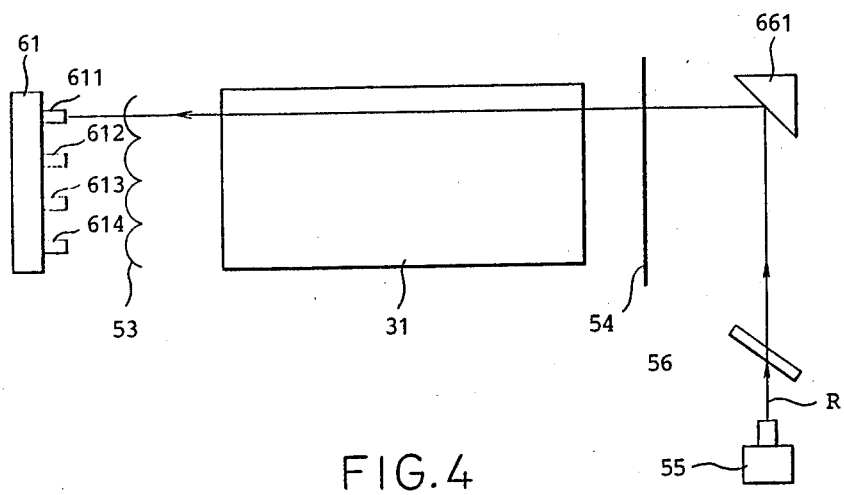
FIG. 4 is a diagrammatical view for use in describing an operation of the solid-state laser device illustrated in FIG. 2.

Referring to FIG. 4 together with FIG. 2, the reference light beam R is sent from the beam generator 55 to the beam distributor 60 through the fixed mirror 56. In this event, the prismal block 63 is rotated around the prismal axis so that the first reflector mirror 661 can receive the reference light beam R, as shown in FIG. 4. The reference light beam R is reflected by the first reflector mirror 661 and is sent through the half mirror unit 54, the slab-shaped laser medium 31, and the reflector unit 53 to the first photoelectric element 611. Thus, the reference light beam R is incident onto the first photoelectric element 661 to be converted into the electric signal. Intensity of the reference light beam R is varied at the first photoelectric element 611 with rotation of the prismal block 63. Specifically, the intensity of the reference light beam R gradually becomes strong and thereafter becomes weak thereat. Thus, the photoelectric element 611 receives the reference light beam R at a maximum intensity when the first side surface intersects the optical axis of the first partial zone 311 at a right angle. On detection of the maximum intensity of the reference light beam R, the control device 52 supplies the detection signal to the drive circuit 51.

Figure 5:
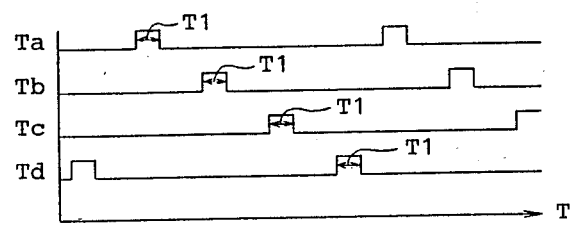
FIG. 5 is a time chart for use in describing another operation of the solid-state laser device illustrated in FIG. 2.

Referring to FIG. 5 in addition to FIG. 2, the drive circuit 51 delivers a first one Ta of the drive signals in response to the detection signal to the first lamp element, namely, the first front and the first rear excitation lamps 461 and 461' to turn them into on states. The first drive signal Ta has a repetition frequency of, for example, 4 Hz and a predetermined pulse duration Tl of, for example, 1 millisecond. Production of the first drive signal Ta may be started slightly before detection of the maximum intensity. As a result, the first partial zone 311 is excited by the first front and the first rear excitation lamps 461 and 461' to generate a first one Ll of the laser beams.

Figure 6:
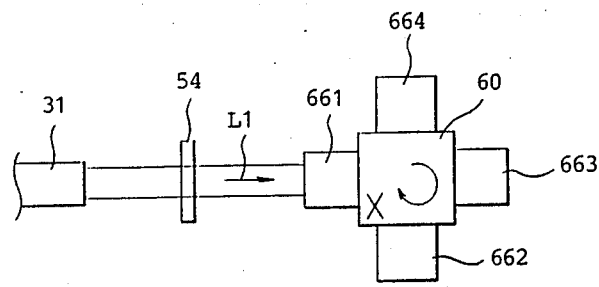
FIG. 6 is a top view of the solid-state laser device illustrated in FIG. 2.

Referring to FIG. 6 afresh and FIG. 2 again, the first laser beam Ll is sent from the first partial zone 311 of the slab-shaped laser medium 31 through the half mirror unit 54 and is incident onto the first reflector mirror 661 to be reflected downwards of FIG. 6.

Figure 7:
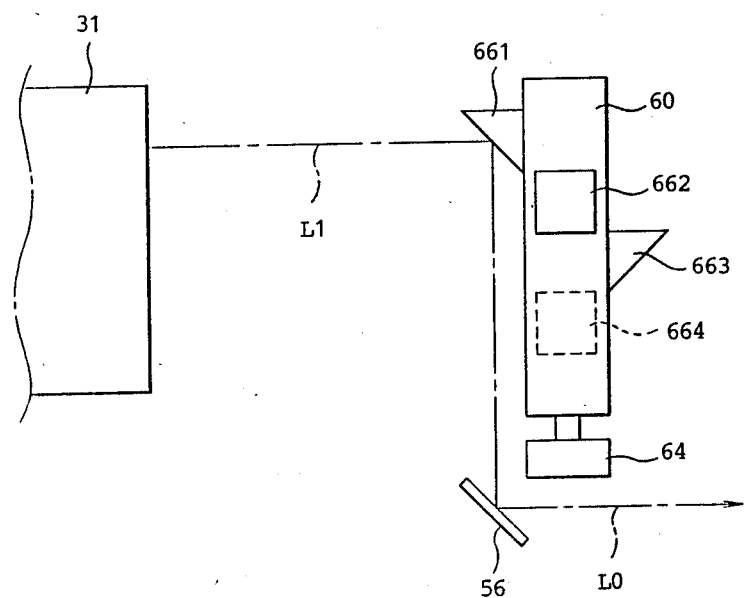
FIG. 7 is an elevational view for use in describing the operation mentioned in FIG. 5 in detail.

Referring to FIG. 7 anew, the first laser beam Ll is reflected at a right angle by the first reflector mirror 661 to be incident onto the principal surface of the fixed mirror 56. The first laser beam Ll is further reflected at a right angle on the fixed mirror 56 again to be produced as the output laser beam Lo.

Referring back to FIGS. 2 and 6, the prismal block 60 is further rotated by the motor device 64 in the sense illustrated by the arrow X in FIG. 6 to make the second reflector mirror 662 face the second partial zone 312. Inasmuch as the reference light beam R is generated from the beam generator 55 during the rotation of the prismal block 60, the second photosensor 612 is given the reference light beam R when the second reflector mirror 662 and the second partial zone 312 are in a face-to-face relationship, as is the case with the first photosensor 611. Consequently, the second front and the second rear excitation lamps 462 and 462' are supplied with a second one Tb of the drive signals from the driver circuit 51, as shown in FIG. 5 to excite the second partial zone 312. The second drive signal Tb has the same repetition and the same pulse duration as those of the first drive signal Ta. As a result, a second one L2 of the laser beams is generated from the second partial zone 312 to be emitted from the half mirror unit 54 to the second reflector mirror 662 when the second laser beam L2 has a gain exceeding a threshold level determined by the resonator.

Similar operation is successively carried out in connection with the third and the fourth lamp elements to generate third and fourth ones L3 and L4 of the laser beams. In this case, each excitation lamp of the third and the fourth lamp elements is turned on at the same repetition frequency as each excitation lamp of the first and the second lamp elements.

Thus, the slab-shaped laser medium 31 is partially and individually illuminated by the four lamp elements. In other words, only a quarter of the slab-shaped laser medium 31 is illuminated by every one of the lamp elements. This means that each of the first through fourth partial zones 311 to 314 is illuminated at a long period. In other words, a frequency of illuminating a whole surface can be reduced in the solid-state laser device. Therefore, it is possible to avoid a rise in temperature of the slab-shaped laser medium 31. As a result, the laser beams can be generated with a high repetition frequency of, for example, 16 Hz in the example illustrated in FIGS. 2 through 7.

Although four pairs of the excitation lamps are disposed on the slab-shaped laser medium 31, it is possible to vary the number of the excitation lamp pairs so as to carry out laser oscillation at a desired repetition frequency. In this event, the prismal block 63 must be changed in configuration in consideration of the number of the excitation lamp pairs. For example, the prismal block 63 may have a plurality of prismal side surfaces the number of which is equal to the number of the excitation lamp pairs and on which the reflector mirrors are located in place, respectively. In this connection, the prismal block 63 may have a configuration approximate to a cylinder with an increase of the number of the excitation lamp pairs. Each elongated excitation lamp may be formed by a plurality of point light sources arranged in row.

Although energization of each lamp element is followed by energization of an adjacent lamp element in the example being illustrated, such an order of energization of the lamp elements may be changed if all of the lamp elements are energized or driven a preselected number of times within a predetermined duration. For example, it is possible to control an order of energization of the lamp elements such that energization of a certain lamp element is followed by energization of another lamp element that is not adjacent to the certain lamp element. In this case, it is possible to favorably reduce a temperature in each of partial zones which are previously and succeedingly excited by the certain lamp element and another lamp element. Accordingly, no thermal overlap takes place between the previously and the succeedingly excited partial zones. It is possible to avoid a heat gradient which might occur due to the thermal overlap. In this event, positions of the reflector mirrors 661 to 664 should be changed on the prismal block 63 with reference to the order of energization.

Each of the lamp elements is composed of two excitation lamps which illuminate the first and the second principal surfaces in the illustrated example. However, only one of the first and the second principal surfaces may be illuminated by a single excitation unit. Each of the first through fourth reflector mirrors 661 to 664 may have a convex or concave principal surface or plane defined by a predetermined curvature. Such a convex or concave principal surface may serve to make the laser beam converge or diverge.

Figure 8:
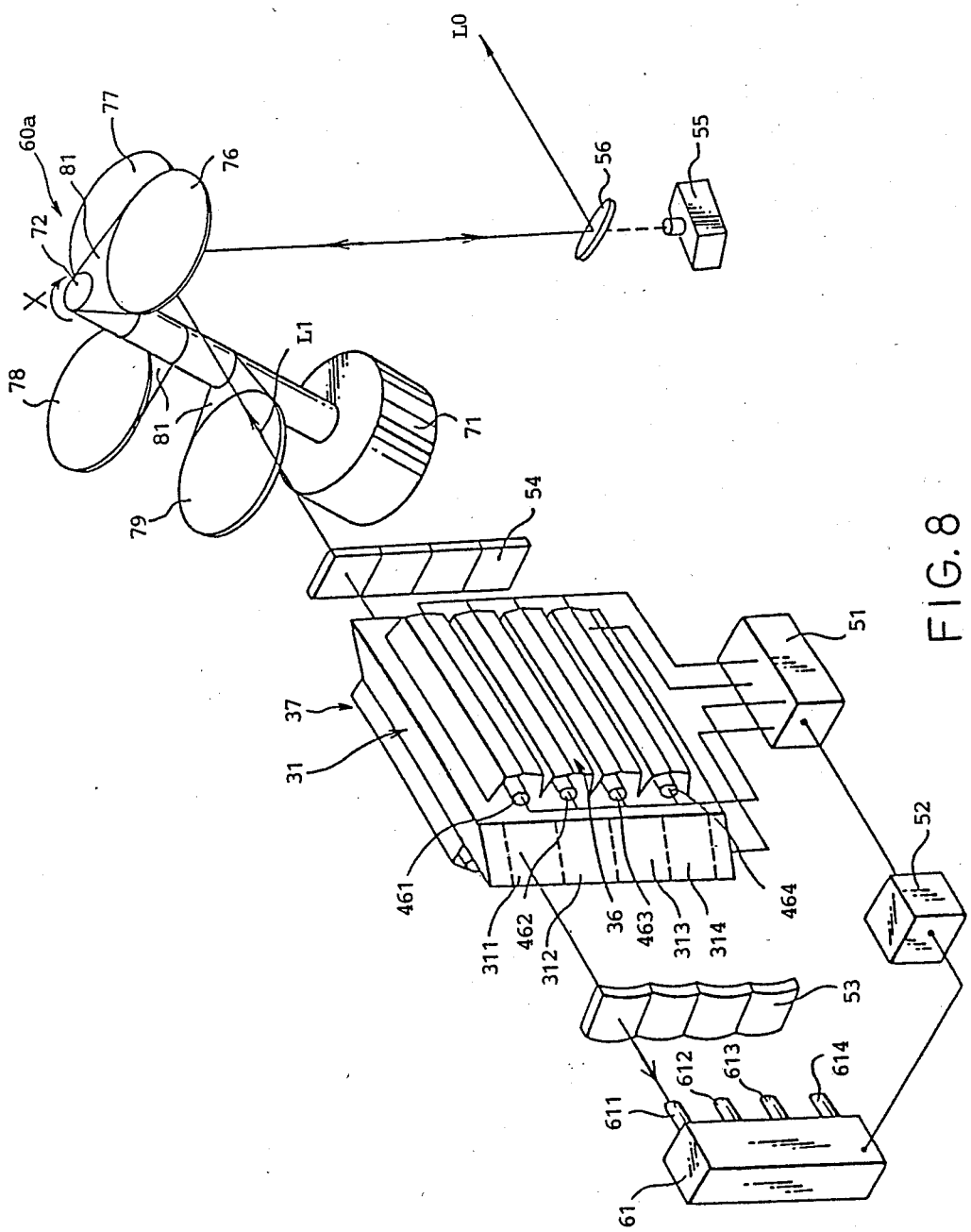
FIG. 8 is a perspective view of a solid-state laser device according to a second embodiment of this invention.
Figure 9:
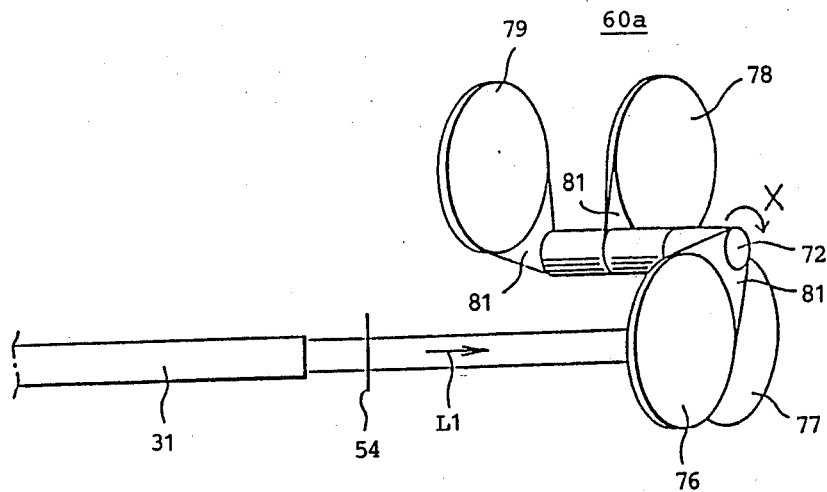
FIG. 9 is a schematic top view of a part of the solid-state laser device illustrated in FIG. 8.
Figure 10:
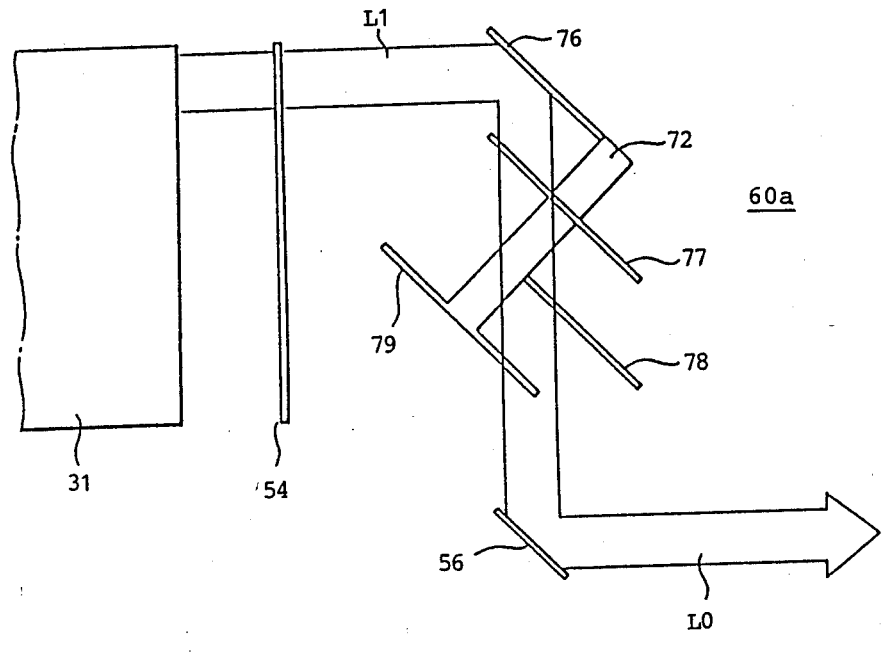
FIG. 10 is an elevational view of a part of the solid-state laser device illustrated in FIG. 8.

Referring to FIGS. 8 through 10, a solid-state laser device according to a second embodiment of this invention is similar in structure to that illustrated in FIGS. 2 through 7 except that the solid-state laser device of FIGS. 8 through 10 comprises a beam distributor which is different from that of the first embodiment and which is therefore depicted at 60a. The illustrated beam distributor 60a comprises pedestal portion 71 which houses a motor device (not shown) and a cylindrical support rod or pole 72 which has a support axis and which is rotatably supported on the pedestal portion 71. The support pole 72 is rotated around the support axis by the motor device. To the support pole 72, first through fourth reflection elements 76 to 79 are fixed via holders 81, respectively, so that the first through fourth reflection elements 76 to 79 are opposite to the first through fourth partial zones 311 to 314 in a manner similar to that illustrated in FIG. 2, respectively. Each of the first through fourth reflection elements 76 to 79 is circular in shape and defines a flat reflection surface.

Temporarily referring to FIG. 10, each of the first through fourth reflection elements 76 to 79 is fixed to the support pole 72 at a right angle, as shown in FIG. 10. In FIG. 10, each reflection surface of the first through fourth reflection elements 76 to 79 is directed downwards of FIG. 10 and is inclined at an angle of 45° to each optical axis of the laser beams emitted from the first through fourth partial zones 311 to 314 of the slab-shaped laser medium 31 through the half mirror unit 54. As a result, the first laser beam L1 is reflected by the first reflection element 76 and is sent from the fixed mirror 56 as the output laser beam Lo. Likewise, the second through fourth laser beams L2 to L4 are generated from the second through fourth partial zones 312 to 314 to be reflected by the second through fourth reflection elements 77 to 79, respectively, when the support pole 72 is rotated around the support axis. The inclination of 45° of each reflection element is helpful to direct each laser beam to the fixed mirror 56. However, such an inclination of 45° may be changed in relation to a position of the fixed mirror 56.

As shown in FIGS. 8 and 9, the first through fourth reflection elements 76 to 79 are azimuthally spaced from one another around the support axis. More specifically, the first through fourth reflection elements 76 to 79 are successively numbered counterclockwise and azimuthally displaced from one another with an angle of 90° left between two adjacent ones of the reflection elements, when they are seen from a top of the support pole 72. The first reflection element 76 is attached to an uppermost portion of the support pole 72 while the second through fourth reflection elements 77 to 79 are successively arranged from the first reflection element 76 downwards with an equidistance left between two reflection elements along the support pole 72.

With this structure, the support pole 72 is arranged in parallel to the optical axes of the laser beams, as shown in FIG. 9 when the laser beams and the support pole 72 are viewed from an upper part thereof.

It is assumed that the beam distributor 60a is rotated clockwise, as indicated at X in FIG. 8. In this event, the first through fourth reflection elements 76 to 79 are periodically opposed or confronted one by one with the first through fourth partial zones 311 to 314, respectively. Like in FIGS. 2 through 7, the reference light beam R is emitted from the beam generator 55 to be sent through one of the reflection elements 76 to 79 and the corresponding partial zone to the corresponding photoelectric element 61 (suffixes omitted). In consequence, the corresponding lamp element is energized to excite the corresponding partial zone and to generate the laser beam. The laser beam is generated through the fixed mirror 56 as the output laser beam Lo. Thus, laser oscillation can be carried out in a manner similar to that illustrated in FIGS. 2 through 7.

In the example being illustrated, each of the first through fourth reflection elements 76 to 79 is rotated within a single plane. This shows that the laser beam is reflected by the corresponding reflection element as long as the reflection element in question is present on the optical axis of the laser beam. In other words, a reflected beam is sent from the reflection element in question as long as the reflection element intersects the laser beam. Accordingly, the laser beam is generated as the output laser beam for a long time in proportion to an area of each reflection element. It is therefore possible to stably derive the output laser beam from each partial zone without any change of direction of the output laser beam Lo. From this fact, it is understood that the output laser beam generated from the illustrated device has high average power in comparison with the output laser beam generated from the first embodiment.

Figure 11:
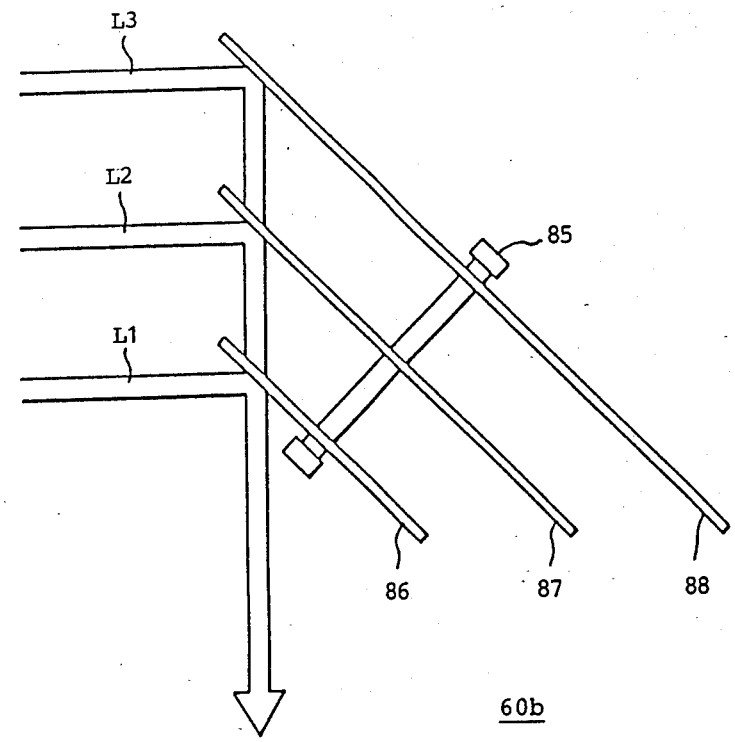
FIG. 11 is an elevational view of a beam distributor for use in a solid-state laser device according to a third embodiment of this invention.
Figure 12:
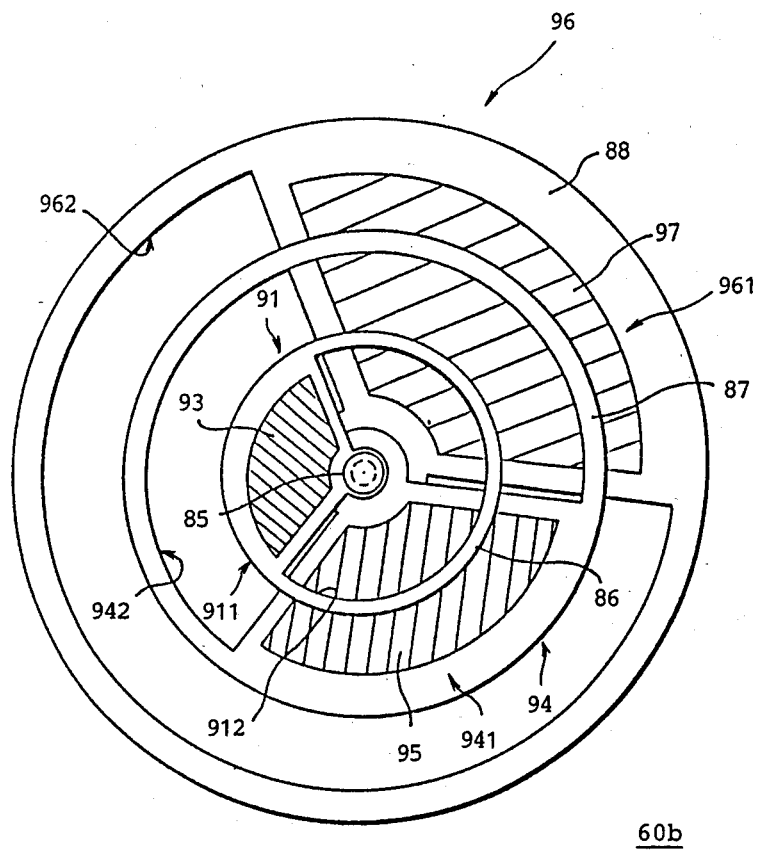
FIG. 12 is a plan view of the beam distributor illustrated in FIG. 11.

Referring to FIGS. 11 and 12, a beam distributor 60b is for use in a solid-state laser device according to a third embodiment of this invention and comprises a support axis 85 rotatably coupled to a motor device (not shown in this figure). In the example being illustrated, it is assumed that a slab-shaped laser medium 31 (illustrated in FIG. 2) is divided into first through third partial zones through which first through third laser beams L1 to L3 are generated, respectively. In this connection, the illustrated beam distributor 60b comprises first through third reflection plates 86, 87, and 88 for reflecting the first through the third laser beams L1 to L3 towards the fixed mirror 56 (FIG. 2), respectively, in a manner similar to that illustrated in FIGS. 2 through 7.

As shown in FIG. 11, the first through third reflection plates 86 to 88 are fixed to the support axis 85 at a right angle. In FIG. 11, the first and the third reflection plates 86 and 88 are fastened at lowest and highest positions of the support axis 85, respectively, while the second reflection plate 87 is fastened at an intermediate position between the lowest and the highest positions with an equidistance left between the second reflection plate 87 and each of the first and the second reflection plates 86 and 88. In addition, the first and third reflection plates 86 and 88 have the smallest and the largest diameters, respectively, while the second reflection plate 87 has an intermediate diameter between the smallest and the largest diameters, as shown in FIG. 11. The support axis 84 is located so that the first through the third reflection plates 86 to 88 are inclined at an angle of 45° to each optical axis of the first through the third laser beams L1 to L3. Therefore, the first through the third laser beams L1 to L3 are reflected at a right angle downwards of FIG. 11.

More specifically, the first reflection plate 86 comprises a first circular frame 91 which is divided into first and second sector portions 911 and 912 having angles of 120° and 240°, respectively. A first reflector 93 is attached to the first sector portion 911 with the second sector portion 912 uncovered. Likewise, the second reflection plate 87 comprises a second circular frame 94 which is divided into first and second sector portions 941 and 942 having angles of 120° and 240°, respectively. A second reflector 95 is attached to the first sector portion 941 of the second circular frame 87 with the second sector portion uncovered. As illustrated in FIG. 12, the second reflector 95 is azimuthally displaced from the first reflector 93 so that they are not overlapped with each other. The third reflection plate 88 comprises a third circular frame 96 which is also divided into first and second sector portions 961 and 962 having angles of 120° and 240°, respectively. A third reflector 97 is attached to the first sector portion 961 of the third circular frame 96 and is disposed so that it is not overlapped with the first and the second reflectors 93 and 95.

With this structure, either one of the first through the third reflectors 93, 95, and 97 can be always disposed on the optical axes of the first through third laser beams L1 to L3. Therefore, it is possible to stably generate the laser beams as the output laser beam Lo with high average power. In addition, the first through the third reflection plates 86 to 88 are coaxially fixed to the support axis 85. Accordingly, the illustrated beam distributor 60b is compact in structure and can save a mounting space thereof.

Figure 13:
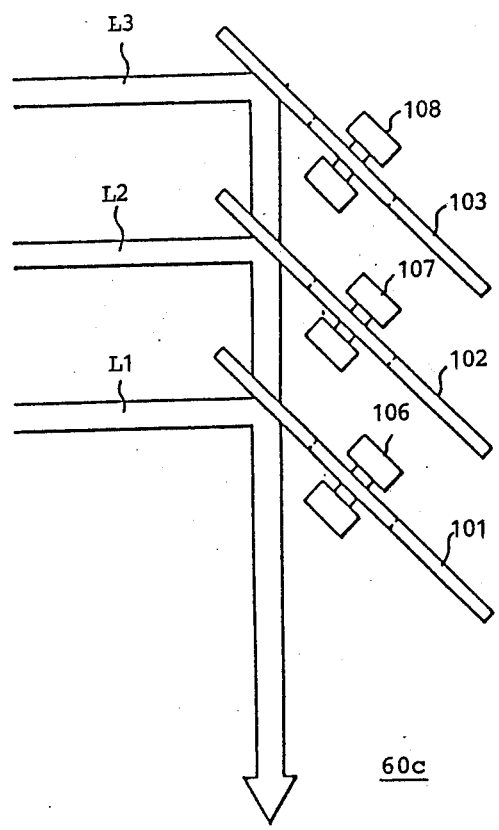
FIG. 13 is an elevational view of a beam distributor for use in a solid-state laser device according to a fourth embodiment of this invention.
Figure 14:
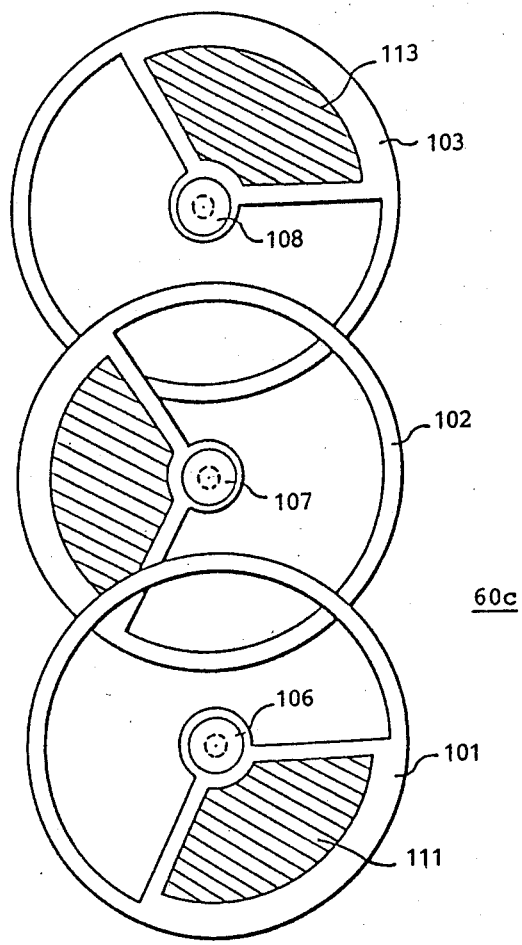
FIG. 14 is a plan view of the beam distributor illustrated in FIG. 13.

Referring to FIGS. 13 and 14, a beam distributor 60c is for use in a solid-state laser device according to a fourth embodiment of this invention and is similar to that illustrated in FIGS. 11 and 12 except that first through third reflection plates 101, 102, and 103 are identical in size to one another and are fixed to individual rotation axes 106, 107, and 108 at right angles, respectively, to be individually driven by motor devices (not shown). As illustrated in FIG. 13, the first through the third reflection plates 101 to 103 are inclined at angles of 45° to optical axes of first through third laser beams L1 to L3, respectively, like in FIGS. 11 and 12.

Each of the first through the third reflection plates 101 to 103 is divided into first and second sector portions having angles of 120° and 240°, respectively. First through third reflectors 111, 112, and 113 are attached to the first sector portions of the first through the third reflection plates 101 to 103, respectively, and are disposed so that they are not azimuthally overlapped with one another, like in FIGS. 11 and 12. The first through the third reflectors 111 to 113 serve to effectively reflect the first through the third laser beams L1 to L3 towards the fixed mirror 56 (FIG. 2) like in FIGS. 11 and 12.

As mentioned before, the slab-shaped laser medium is spatially divided into a plurality of partial zones each of which is periodically excited to cause laser oscillation to occur in each of the partial zones. Accordingly, it is possible to raise average output power by increasing a repetition frequency of the laser oscillation which is periodically repeated. Such division of the slab-shaped laser medium into the partial zones results in a reduction of each beam size generated from the partial zones. This makes it easy to handle each laser beam because optical articles may be simple in structure and small in size. Moreover, a plurality of excitation lamps may be used in the solid-state laser device according to this invention. It is therefore possible to remove a restriction which might be imposed on the output laser beam by input energy when a single excitation unit is used.

While this invention has thus far been described in conjunction with a few embodiments thereof, it will be readily understood for those skilled in the art to put this invention into practice in various other manners. For example, the beam distributor may not always be rotated around an axis but reciprocally moved in a direction transverse to each optical axis of the laser beam generated by the respective partial zones. More particularly, such a beam distributor may have a plurality of reflectors each of which is reciprocally and synchronously driven by a transport member so that each reflector intersects a corresponding one of the laser beams. On the other hand, the beam distributor may comprise a single reflector and a drive member for vertically driving the single reflector along the second end surface of the slab-shaped laser medium 31 on the straight in synchronism with energization of each excitation unit. In this event, it is possible to optionally determine an excitation time T1 of each excitation unit regardless of rotation of the prismal block 63. Such an excitation time may be determined by the control device 52. In addition, the excitation times may be varied at every one of the excitation units. The solid-state laser device may be a laser amplification device, although description has been directed to the laser oscillation device. In addition, the motor device 64 (FIG. 2) may be electrically controlled by the driver circuit 51 so as to synchronize the motor device 64 with excitation of the excitation lamps.

What is claimed is:

1. A solid-state laser device comprising:
   a slab-shaped laser medium having first and second principal surfaces parallel to each other, first and second end surfaces opposite to and contiguous to said first and said second principal surfaces, and a pair of side surfaces opposite to each other and contiguous to said first and said second principal surfaces and said first and said second end surfaces, said slab-shaped laser medium being divisible into first through n-th partial zones extended between said first and said second end surfaces along said side surfaces, where n is a natural number greater than unity;
   first through n-th controllable exciting means for individually and locally exciting said first through n-th partial zones to selectively produce first through n-th laser beams through said first and said second end surfaces;
   beam directing means optically coupled to said first through n-th laser beams for directing each of said first through n-th laser beams to a predetermined position as an output laser beam; and
   driving means for selectively driving said first through n-th controllable exciting means in synchronism with said beam directing means by optically coupling said first through n-th controllable exciting means to said beam directing means.

2. A solid-state laser device as claimed in claim 1, wherein said beam directing means comprises:
   a prismal block having a prismal axis and a prismal side surface surrounding said prismal axis, said prismal block being placed so that said first through n-th laser beams are incident onto first through n-th different positions of said prismal side surface at a predetermined angle;
   revolving means coupled to said prismal axis for revolving said prismal block around said prismal axis;
   first through n-th reflectors placed at said first through n-th different positions of the prismal side surface for reflecting said first through n-th laser beams towards said predetermined position to produce said output laser beam through said predetermined position, respectively, when said prismal block is revolved in synchronism with said first through n-th exciting means under control of said driving means.

3. A solid-state laser device as claimed in claim 2, wherein n is equal to four, said prismal block being a rectangular prism while said prismal side surface is divisible into first through fourth incident surfaces which provide first through fourth ones of said different positions thereon, respectively,
   said beam directing means comprising:
   first through fourth reflectors which are placed at said first through fourth different positions as said first through n-th reflectors and which are selectively opposed to said first through fourth partial zones of the slab-shaped laser medium one at a time when said prismal block is revolved by said revolving means.

4. A solid-state laser device as claimed in claim 3, wherein each of said first through fourth reflectors has a reflection surface inclined at a predetermined angle to each of said first through said fourth laser beams.

5. A solid-state laser device as claimed in claim 1, wherein said beam directing means comprises:
   a pedestal portion;
   a rotatable support pole which is rotatably supported by said pedestal portion and which has a support axis; and
   first through n-th reflectors fixed to said support pole at first through n-th different positions which are different from one another azimuthally and axially around and along said support axis, respectively, said first through n-th reflectors being opposed to said first through n-th partial zones one at a time when said support pole is rotated to said first through n-th different positions, respectively.

6. A solid-state laser device as claimed in claim 5, wherein each of said first through n-th reflectors defines a reflection surface inclined at a predetermined angle to each of said first through n-th laser beams.

7. A solid-state laser device as claimed in claim 1, wherein said beam directing means comprises:
   a rotatable support having a support axis; and
   first through n-th reflection plates fixed to said rotatable support so that said first through n-th reflection plates intersect said first through n-th laser beams, respectively;
   said first through n-th reflection plates comprising first through n-th frames axially spaced apart from one another along said support axis; and
   first through n-th reflectors which are attached to said first through n-th frames, respectively, and which have first through n-th sector configurations extended from said support axis at a preselected angle.

8. A solid-state laser device as claimed in claim 1, wherein said beam directing means comprises:
   first through n-th rotatable supports having first through n-th support axes; and
   first through n-th reflection plates fixed to said first through n-th supports so that said first through n-th reflection plates intersect said first through n-th laser beams, respectively;

said first through n-th reflection plates comprising first through n-th reflectors of sector configurations extended from said first through n-th supports at a predetermined angle, respectively.

9. A solid-state laser device as claimed in claim 1, wherein said driving means comprises:
beam generating means for generating a reference light beam of a predetermined wavelength;
guide means for guiding said reference light beam towards said beam directing means to allow said reference light beam to transmit a selected one of said first through n-th partial zones;
detecting means for detecting the reference light beam received through said selected one of the first through n-th partial zones to produce a detection signal representative of said selected one of the first through n-th partial zones; and
means responsive to said detection signal and coupled to said first through n-th exciting means for energizing a selected one of the first through n-th exciting means that corresponds to said selected one of the first through n-th partial zones.

* * * * *